Patented Nov. 12, 1929

1,735,398

UNITED STATES PATENT OFFICE

FRANK O. HOAGLAND, OF BRIDGEPORT, CONNECTICUT, ASSIGNOR TO PRATT & WHITNEY COMPANY, OF NEW YORK, N. Y., A CORPORATION OF NEW JERSEY

AUXILIARY TOOL-ROTATING DEVICE FOR BORING AND DRILLING MACHINES

Application filed February 10, 1927. Serial No. 167,280.

This invention relates to a "speed-up" device or attachment for a drilling or other machine having a tool supporting spindle rotatably mounted within an axially movable member or sleeve.

An object of the present invention is to provide an improved form of drill speeding device adapted to be applied directly to the spindle and axially movable member of a drilling or boring machine so that drills or other tools of small size may be rotated at greatly increased speeds over the speeds of the tool spindle furnished with and rotated by the means normally used with the machine.

One feature which enables me to accomplish the above named object is that I mount a sleeve or bushing directly within the tool holding recess of the machine spindle and mount the auxiliary or high speed tool holding member directly and rotatably within it. This sleeve is adapted to be retained in operative position within the spindle by a member preferably threaded upon the outside of the spindle which may also carry a driving gear for the auxiliary spindle. Intermediate gears connecting this driving gear with the "speed-up" spindle are also housed within the device.

Another object of importance of the present invention is the provision of an auxiliary tool rotating member that may be mounted on the end of the machine spindle with a minimum overhanging distance.

Another object of importance of the present invention is that the entire mechanism may be secured rigidly and without rotation to the lower end of the sleeve or axially movable member within which the main tool spindle rotates.

A still further object of the invention is to provide an auxiliary high speed spindle for a drilling or boring machine adapted to extend centrally within and be supported within the main spindle of the machine.

With these and other objects in view, my invention consists in the features of construction and operation set forth in the following specification and illustrated in the accompanying drawings.

In the accompanying drawings annexed hereto and forming a part of this specification, I have shown my invention embodied in an attachment for a jig boring machine, but it will be understood that the invention can be otherwise embodied and that the drawings are not to be construed as defining or limiting the scope of the invention, the claims appended to this specification being relied upon for that purpose.

In the above mentioned drawings I have shown but one embodiment of the invention which is now deemed preferable, but it is to understood that changes and modifications may be made within the scope of the appended claims without departing from the spirit of the invention.

Briefly and in its broadest aspect, my invention comprises the following principal parts: First, a body member adapted to be secured in fixed position upon the end of an axially movable but non-rotating member surrounding a rotatable spindle; second, a sleeve or bushing adapted to be inserted within the tool receiving recess of a rotatable spindle; third, a retaining member for this bushing or sleeve preferably threaded to the outside of the spindle and having a driving gear for the auxiliary spindle thereon; fourth, an auxiliary tool holding member rotatable within the bushing or sleeve inserted within the spindle; fifth, an intermediate driving member rotatably mounted upon an axis parallel to the spindle and retained within the body member; sixth, gears thereon engaging respectively the driving gear and a gear on the auxiliary tool holding spindle; and seventh, tool retaining means adapted to hold a tool in the auxiliary tool holding member.

Referring more in detail to the figures of the drawings, I provide an improved form of "speed-up" device for drills or other tools, particularly designed for precision work and so designed that it has a minimum distance from the end of the machine spindle to the outer end of the auxiliary tool supporting and rotating member. I also provide improved means for centering the auxiliary tool supporting member or spindle within the machine spindle so that it will be disposed precisely axially therein. The device comprises a body member 10 supported upon and depending from the axially movable member 11 of the machine to which the device is attached.

Figure 1:
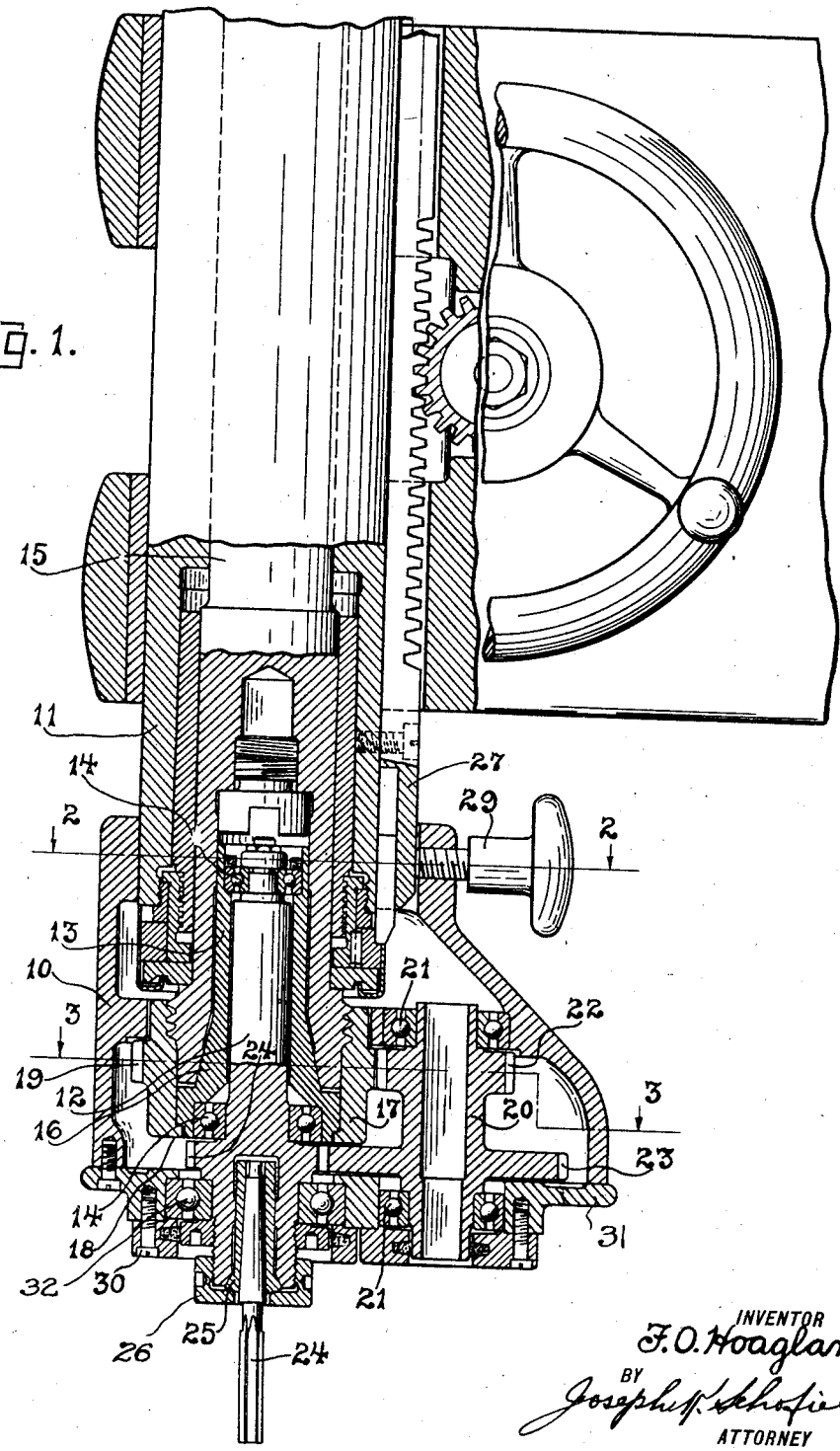
Figure 1 is a side elevation in section of the "speed-up" device applied to the spindle of a boring machine.

The auxiliary tool supporting and rotating spindle 12 is preferably, and as shown in Fig. 1, rotatably mounted within a suitable sleeve or bushing 13. Bearings 14 for this auxiliary spindle 12 are shown as of the ball type and are provided adjacent the inner and outer ends of this bushing or sleeve 13 so that this tool holding and rotating spindle 12 may be rotated at high speed with minimum friction. The bushing or sleeve 13 is adapted to be inserted within the tool receiving recess of the main spindle 15 of the machine and may preferably be provided with a conical portion 16 engaging the conical portion of the recess within the main spindle 15.

In order to force the bushing 13 upward and retain it in operative position within the main tool spindle 15 of the machine, a member 17 is threaded directly to the outside of the main spindle 15 and is provided with an internal annual projecting portion 18 engaging over the outer end of the bushing 13. This retaining member 17 may preferably be provided with gear teeth 19 upon its periphery which form the driving means for the auxiliary tool holding spindle 12. Mounted within the body member 10 so that it will extend parallelly to the axis of the main spindle 15 is an intermediate driving member 20. This, as shown clearly in Fig. 1, is rotatably mounted within suitable bearings 21 within the body member 10 and is provided with two spaced spur gears 22 and 23. One of these spur gears 22 on the intermediate member 20 is in mesh with the gear teeth 19 on the retaining member 17 for the auxiliary tool spindle 12 and the second gear 23 on the intermediate member 20 is in mesh with gear teeth 24 formed integrally on the auxiliary tool supporting and rotating spindle 12. The ratio of these gears 19—22—23—24 is such that the auxiliary spindle 12 is rotated at a greatly increased speed compared with that of the main spindle 15.

In order to retain tools such as shown at 24 within this auxiliary tool spindle 12, a collet 25 is inserted within a recess formed in this member 12 into which the tool shank may be placed. A collet closing member 26 threaded to the outer periphery of the auxiliary tool rotating spindle 12 provides means for forcing this collet 24 into clamping engagement with the shank of tool 24.

Figure 2:
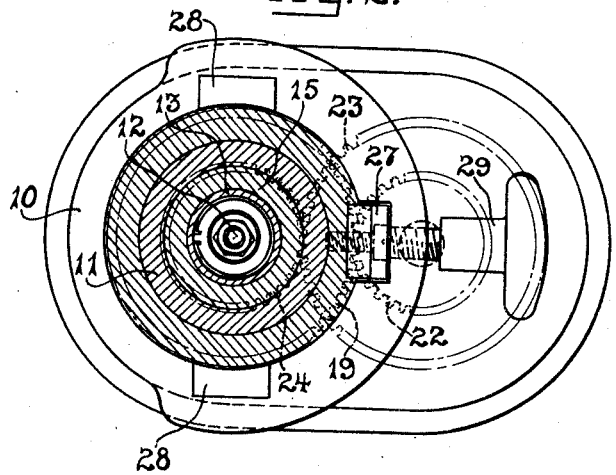
Fig. 2 is a horizontal sectional view taken substantially on the line 2—2 of Fig. 1.
Figure 3:
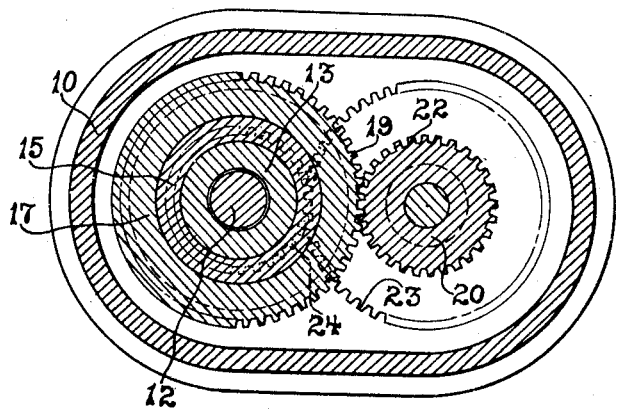
Fig. 3 is a similar sectional view taken upon the line 3—3 of Fig. 1.

The body member 10 within which the auxiliary spindle 12 and intermediate member 20 are mounted is adapted to fit around the lower end of the sleeve 11 for the main spindle 15, the opening in the upper portion of the body member 10 being formed to fit over the rack 27 extending along the rear of the sleeve 11. As shown in Fig. 2 this opening in the body member 10 may be formed with several recesses 28 for the rack 27 so that the body member 10 may be placed over the sleeve 11 in a plurality of different angular positions. A screw 29 extending through the body member 10 serves to secure the body member 10 in position. Also, as shown in Fig. 1, the body member is formed of two principal parts secured together by suitable screws 30, one of which is shown in this figure. The lower part 31 of body member 10 supporting the lower bearing 21 for the intermediate member 20 has a bearing 32 for rotatably supporting the lower end of the auxiliary spindle.

What I claim is:

1. A speed-up attachment for drilling machines having a main spindle rotatably mounted within an axially movable but non-rotatable sleeve comprising in combination, a body member adapted for attachment to said sleeve, a driving member within said body member adapted to be secured to said spindle, a gear formed on said last mentioned member, an intermediate member rotatably mounted within said body member and having a gear engaging the gear on the driving member, a bushing entering the main spindle, retaining means for said bushing on said driving member, an auxiliary tool spindle rotatably mounted within said bushing, and gears connecting said intermediate member and auxiliary spindle.

2. A speed-up attachment for drilling machines having a main spindle rotatably mounted within an axially movable but non-rotatable sleeve comprising in combination, a body member adapted to be secured in fixed position to the sleeve of said drilling machine, a driving member within said body member adapted to be secured to the outside surface of said spindle, a gear formed on said last mentioned member, an intermediate member rotatably mounted within said body member and having a gear engaging the gear on the driving member, a bushing entering the main spindle, means on said driving member for supporting and retaining said bushing within said spindle, an auxiliary tool spindle rotatably mounted within said bushing, and gears connecting said intermediate member and auxiliary spindle.

In testimony whereof, I hereto affix my signature.

FRANK O. HOAGLAND.